United States Patent [19]

Mack

[11] Patent Number: 5,912,561
[45] Date of Patent: Jun. 15, 1999

[54] METHOD AND APPARATUS FOR PACKAGE WALL TESTING

[75] Inventor: Robert Mack, Flemington, N.J.

[73] Assignee: Colgate-Palmolive Company, New York, N.Y.

[21] Appl. No.: 08/942,151

[22] Filed: Oct. 1, 1997

[51] Int. Cl.⁶ .................................................... G01R 27/26
[52] U.S. Cl. ........................ 324/718; 324/713; 72/49.2 R
[58] Field of Search ...................... 324/713, 715, 324/716, 718, 662, 671; 73/46, 49.2 T, 49.2 R

[56] References Cited

U.S. PATENT DOCUMENTS

| | | | |
|---|---|---|---|
| 3,012,432 | 12/1961 | Moore | 73/49.2 |
| 4,055,984 | 11/1977 | Marx | 73/49.2 |
| 4,118,972 | 10/1978 | Goeppner | 73/49.2 |
| 5,140,274 | 8/1992 | Wertz | 324/671 |
| 5,191,785 | 3/1993 | Kidd | 73/49.2 |
| 5,661,406 | 8/1997 | Daily | 324/713 |
| 5,691,648 | 11/1997 | Cheng | 324/716 |

*Primary Examiner*—Maura Regan
*Attorney, Agent, or Firm*—Michael McGreal

[57] ABSTRACT

Any voids in the divider walls of multichamber packages, and in particular, multichamber tubes, can be detected by applying a potential difference across the divider walls of the package. If there is a void, there will be an arcing of current from one electrode to another with a measurable difference in the potential difference between the electrodes. There also may be a visual and/or audible indication. This change in potential difference can be used to determine the integrity of the divider walls of the package. In a preferred mode, the electrodes also are the mandrel mold sections that are used for the compression molding of the shoulder and nozzle onto the body of a tube package. In this embodiment the integrity of the divider walls can be determined prior to the forming of the shoulder and nozzle onto the tube body or after the shoulder and nozzle is formed onto the tube body.

22 Claims, 3 Drawing Sheets

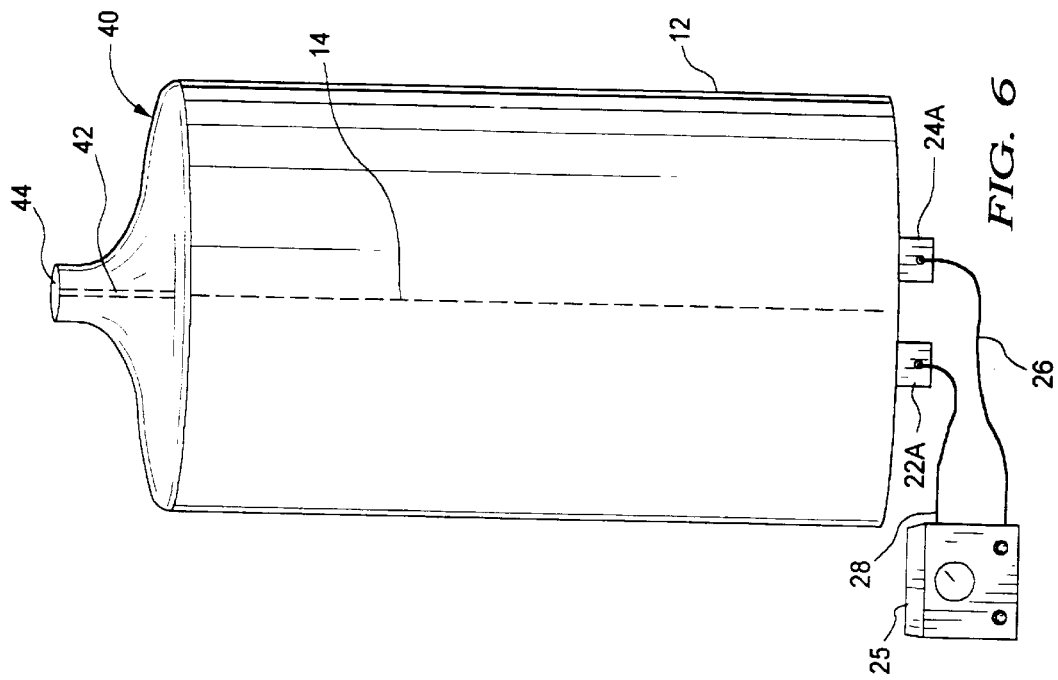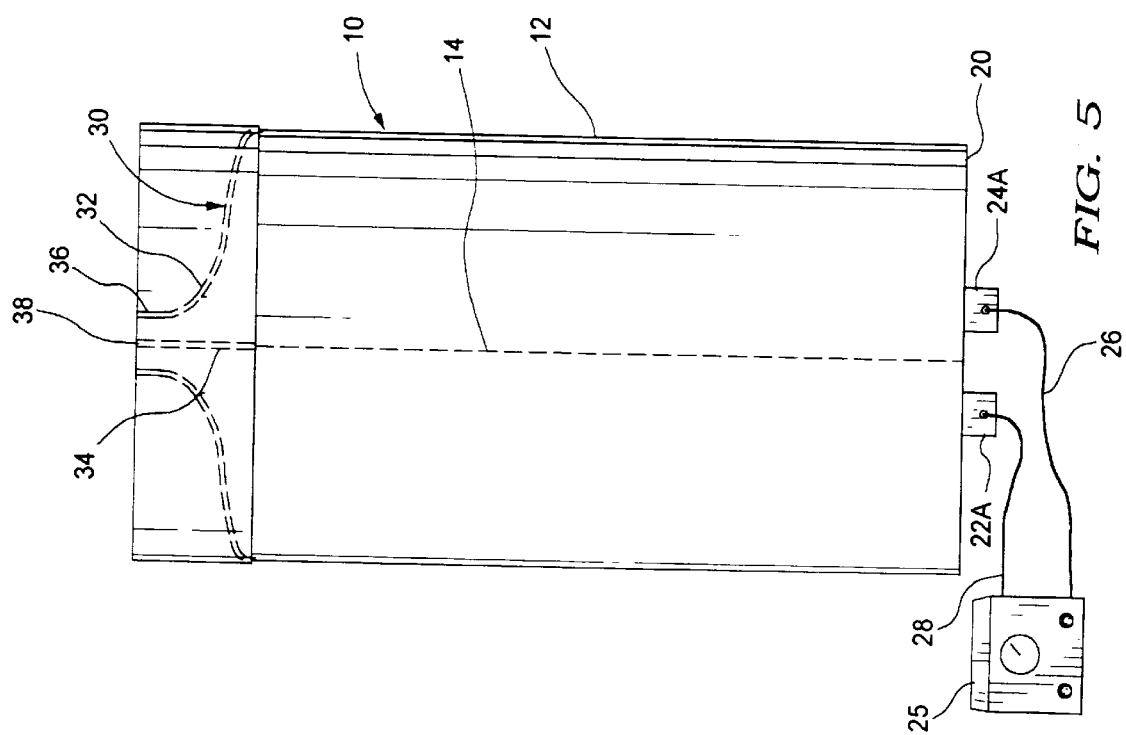

METHOD AND APPARATUS FOR PACKAGE WALL TESTING

FIELD OF THE INVENTION

This invention relates to a method and apparatus for the testing of barrier walls of a package for voids. More particularly, this invention relates to a method and apparatus for the testing of an internal barrier wall of a tube package for voids.

BACKGROUND OF THE INVENTION

Various packaging is produced with two or more chambers. This includes bottles, syringes, dispensing pumps and tubes. In most applications it is important that the components of the chambers not come into contract until the components are dispensed from the package. This is the case since in many instances the components are reactive. Consequently, the separating walls in the package must be of a high integrity. There cannot be any voids in the wall material. This then presents the problem with regard to determining if there are any voids in the walls of a finished package. Preferably this should be accomplished at an early stage so that time and materials are not expended in the manufacture of entire packages that may have defects in the material of the divider walls.

It has been found that the divider walls of packages, and in particular tube packages, can be tested as to integrity by electric potential testing techniques. A voltage potential is placed on an electrode on one side of the wall versus an electrode on the other side of the wall. The potential difference is adjusted so that the divider wall material insulates the electrodes, one from the other. However, if there is a void in the wall, there is a leak of current through the barrier void with a change in potential. This change in potential then can be measured and noted to reject the container with this void containing interior wall. This is a very effective technique for the testing of multichamber tubes, and in particular, dual chamber tubes. This is the case since the test technique can be incorporated into the process of making the tube. That is, the divider walls can be tested for voids after the manufacture of the tube body and prior to the full construction of the tube.

BRIEF SUMMARY OF THE INVENTION

This invention is directed to the testing of the inner divider walls of packages for voids, and in particular, at the time that the package is being constructed. The voids can be from defects in the film of the divider wall or voids in the region of the attachment of the inner divider walls to the outer wall. These latter voids are created at the time of the attachment of the divider walls to the outer wall. This testing for voids is accomplished by having an electrode on each side of one of the divider walls and applying a potential difference between the two electrodes. If there is a void, there will be a change in the potential difference, usually with a visible and/or an audible arcing. There will be an arcing of current through both direct and circuitous voids. A direct void is one that has an essentially straight path through a wall. A circuitous void is one that does not have an essentially straight path through a wall but a more random path. This testing for both direct and circuitous voids is advantageous since components of a composition could traverse both direct and circuitous voids. This is particularly the case when it is considered that the components can be stored in the package for from several months to several years.

This void testing technique is particularly useful when integrated into the tube manufacturing process. In one method of manufacturing multichamber tubes, the top shoulder and nozzle portions, including the divider wall in the top shoulder, are simultaneously made and attached to the outer wall and inner divider walls of the tube body in one step by compression molding. In this process a chamber mold section is placed in each chamber of the tube body, each extending up through the top of the tube body and into the space where the top shoulder is to be formed. The chamber mold sections are complementary in shape to the inner surfaces of the top shoulder. These chamber mold sections mate with a top mold section that is complementary to the exterior shape of the shoulder and nozzle. The shoulder and nozzle are formed while at the same time being bonded to the outer wall of the tube body and to the divider wall or walls of the tube body. This is an efficient way to complete the construction of the tube.

In this process the chamber mold sections that are placed into each tube chamber can also be the electrodes for the detection of voids. The chamber mold sections are constructed so that the portion adjacent to the interior wall or walls can maintain a potential difference on the electrodes, except for any voids in the interior walls, at the junction of the interior walls and tube body or in the compression molded shoulder divider wall. That is, the electrodes are designed so that they are maintained in a close contact with the divider walls and there is no arcing around the top or bottom of the interior walls. The potential can be applied to the mold pieces prior to or after the compression molding of the tube shoulder and nozzle onto the tube body. That is, the integrity of the divider walls can be determined prior to the upper part of the tube being formed onto or attached to the tube body, or after the upper part has been formed onto or attached to the tube body. It is preferred that it be conducted after the forming of the top shoulder onto the tube body since then the integrity of the divider wall in the top shoulder and the integrity of the seal between the divider wall in the tube body and in the top shoulder can be determined simultaneously.

Although the tube bodies can be tested separately, the incorporation of the testing into the formation of the completed tube is the preferred embodiment. This will provide information at the time of tube manufacture and will require less tube handling. Also, the possibility of damaging the divider wall or walls by the later insertion of electrodes into the chambers of the finished tube to test the integrity of the tube divider walls is obviated. However, although not a preferred embodiment, the integrity of the tube divider walls can be tested after the tube has been fully constructed and just prior to the filling operation.

The testing can be conducted using a dry or wet testing technique. In the dry testing technique a higher voltage is used with the air in a film void breaking down to allow for the passage of a current. In the wet testing technique a liquid electrolyte material is coated onto at least one surface of a film. This liquid goes into voids and acts as a path to transmit the applied current through the voids. In either technique the passage of a current through a film is evidence of the presence of a void. The dry technique is preferred although higher voltages need to be used. This is the case since in the wet technique the surface that was tested would have to be cleaned after testing and prior to use of the container. This would add several steps such as coating with a liquid, removing the liquid after testing and drying. This is cumbersome and adds expense to the testing of containers.

The apparatus for the preferred dry testing of the divider walls is comprised of the electrodes and a source of a potential difference in the range of about 200 volts to about 5000 volts, and preferably about 500 volts to about 2500 volts and most preferably about 800 volts to about 1600 volts. The interior divider walls have a thickness of about 25 microns to about 200 microns, and preferably about 50 microns to about 150 microns. The outer wall can be of essentially any thickness such as 250 to 500 microns. The voltage used will be dictated by the thickness of the interior walls and the insulation properties of the polymers used. The dielectric constant of the polymers will have to be considered. The potential is set so that the interior divider wall or walls are effective insulators, except if there is a void. If there is a void, the wall or walls will not have insulating properties at the point of the void. This is the case whether it is a direct void or a circuitous void. There will be a telltale arcing of the current through the void. In many instances, besides a reduction in the potential difference, there can be an audible and/or visible indication of a void. As an option, this can be designed into the test apparatus.

BRIEF DESCRIPTION OF THE DRAWINGS

FIG. 5 is an elevational view of the tube body of FIG. 4 with the compression mold piece for forming the shoulder and nozzle in place.

FIG. 6 is an elevational view of the finished dual chamber tube with the electrodes in place.

DETAILED DESCRIPTION OF THE DRAWINGS

The invention will be described with regard to the preferred embodiment. The preferred embodiment is the dry testing of the integrity of the divider wall of multichamber tubes, and in particular, of dual chamber tubes. Although described with regard to this preferred embodiment, the invention encompasses the testing of the integrity of related parts of packages.

Figure 1:
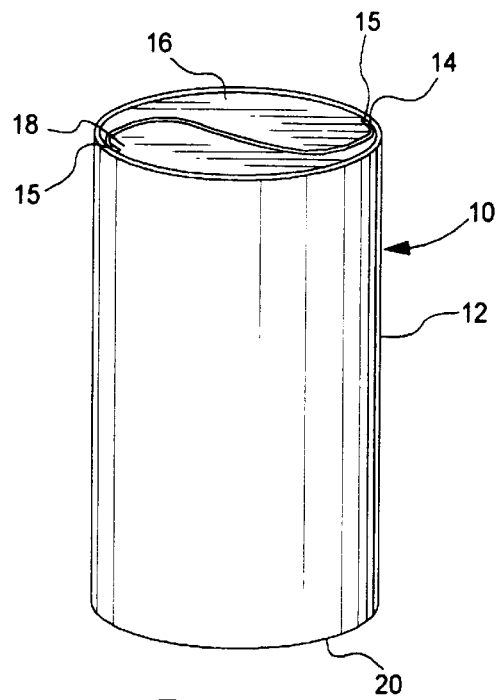
FIG. 1 is an elevational view of a body of a dual chamber tube.
Figure 3:
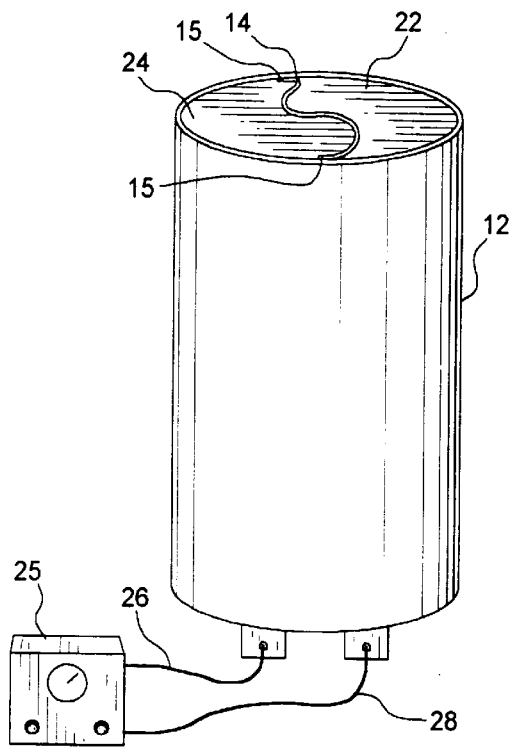
FIG. 3 is an elevational view of a tube body with electrodes in each chamber.
Figure 2:
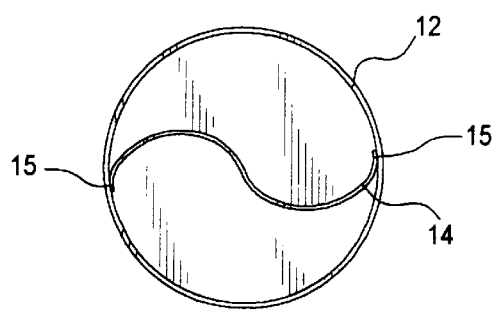
FIG. 2 is a top plan view of the tube body.
Figure 4:
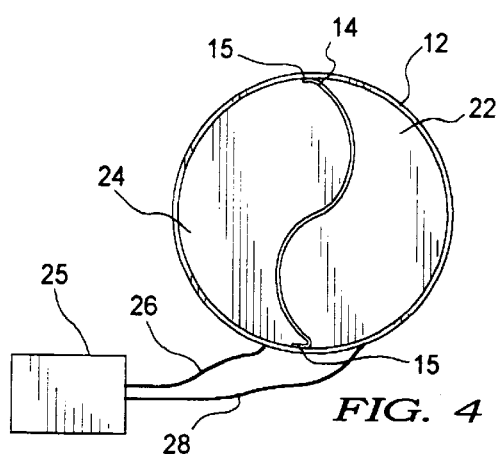
FIG. 4 is a top plan view of the tube body of FIG. 3.

In FIG. 1 there is set out tube body 10 having outer wall 12 and inner divider wall 14. The inner divider wall separates the tube body into chambers 16 and 18. The inner divider wall preferably is wider than the tube diameter as shown in FIG. 2. However, the wall can be of essentially any other shape or width, and can be linearly across the tube. The bottom edge of the tube is 20. The inner divider wall is attached to the outer wall at 15. The attachment can be as shown in FIG. 1 and FIG. 2 on the opposite sides of the divider wall or as shown in FIG. 3 and FIG. 4 on the same sides of the divider wall. Voids can be created in the area 15 when the divider wall is attached to the outer wall. These are all considered to be voids in the divider wall.

In FIG. 3 the tube body 10 is shown with electrodes 22 and 24. There is an electrode on each side of the inner divider wall 14. Leads 26 and 28 connect the electrodes to voltage regulator 25. The voltage regulator will apply a voltage of about 200 to about 5000 volts, preferably about 500 to about 2000 volts, and most preferably about 800 to 1600 to the electrodes. A suitable regulator is the Holiday Detector, Model 14/20. The exact voltage will, to a degree, depend on the thickness of the inner divider wall 14 as well as the dielectric constant of the polymers used. The thickness will be about 25 microns to 200 microns, and preferably about 50 microns to about 150 microns. Upon the existence of any voids, the voltage will drop. Also, in most instances there will be a visible and audible arcing. FIG. 4 shows the structure of the device of FIG. 3 in a top plan view. The inner divider wall can be tested in this form. A potential difference is applied to the electrodes. The applied voltage is adjusted such that an inner divider wall 14 and attachment regions 15 without any voids is a good insulator. The potential difference remains constant. There is no arcing of the current. However, if there is a void there is an arcing through the void with a decrease in voltage and an audible indication.

In FIG. 5 there is shown the tube body 10 with electrode/mold mandrel pieces 22(a) and 24(a) inserted into the chambers of the tube body. In this embodiment the electrodes and the mold sections for the compression molding of the shoulder and nozzle onto the tube body are one and the same. These electrode/mold mandrel sections mate with compression mold section 30. This compression mold comprises channels 32 and 34 for the flow of heated plastic to the junction with outer wall 12 and to an inner divider wall 14. The heated plastic contacts the upper edge of the wall of the tube body and the upper edge of the divider wall and forms a strong bond to both the top edge of the outer wall 12 and inner divider wall 14. The plastic in channel 32 forms the shoulder and nozzle wall and the channel center divider wall in the shoulder so that there is a continuous chamber divider wall from the bottom edge 20 of the tube body up to the exit 38 of nozzle 36. Either before or after the shoulder and nozzle have been formed the integrity of the inner divider wall 14 can be tested. This is accomplished in the same manner as in FIG. 3.

FIG. 6 is related to FIG. 5. Here the compression mold 30 has been removed. If the tube inner wall has not been tested for integrity prior to the compression molding step, the tube inner divider wall can be tested at this time as shown in the embodiment of FIG. 5 and FIG. 6. In this embodiment the electrodes also function as the mold pieces for the compression molding of the shoulder and nozzle. In this way these electrode/mold mandrels perform two functions.

Figure 7:
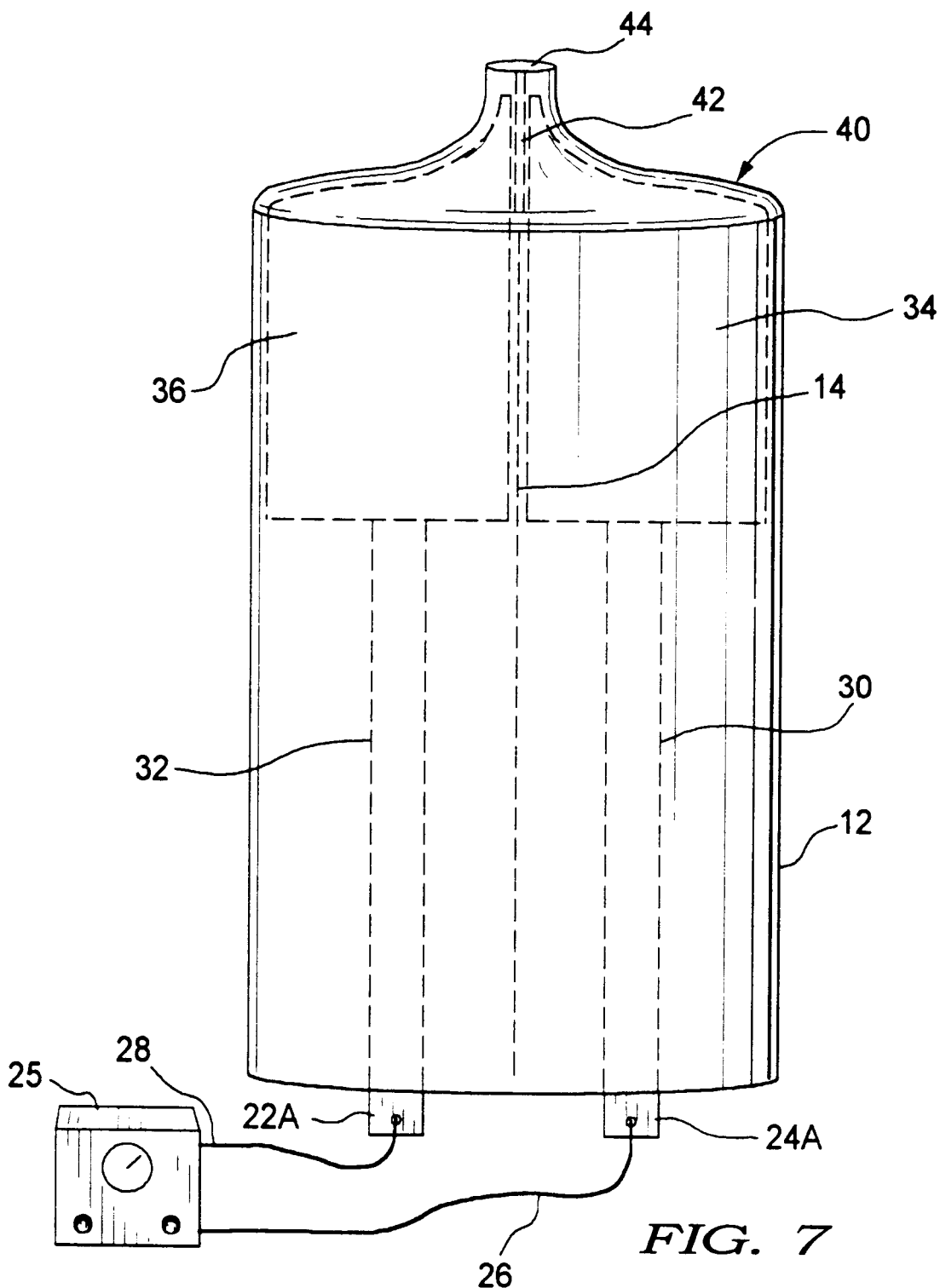
FIG. 7 is an elevational view of an electrode arrangement where the tube passes over the electrodes.

FIG. 7 shows an embodiment where the tube is passed over the electrodes 34 and 36 with the electrodes scanning the surface of the tube divider wall 14 and the attachment regions 15 for voids. As the tube divider wall 14 moves between the electrodes 34 and 36, any void will be indicated by a change in the potential difference. The electrodes can be of essentially any length and are illustrated as being about a quarter of the length of the divider wall. Rods 30 and 32 support the electrodes. In this technique it is easier to locate the place of the void since only a part of the divider wall is being tested at any given time. In this test procedure the electrodes are spread apart so that the divider wall can be threaded between the electrodes. The electrodes then are placed in a close contact with the divider wall. The tube then is moved upwardly so that the electrodes scan the full surface of the inner divider wall. Consequently, there can be a static test where the electrodes and tube are held stationary, or a dynamic test where the electrodes and tube are moved relative one to the other so that the inner divider wall can be scanned for voids.

The tube can be constructed of essentially any thermoplastic resin. The preferred plastics are the polyolefins, and in particular, homopolymers and copolymers of polyethylene and of polypropylene, polyesters such as polyethylene terephthalate, polyethylene terephthalate modified resins, vinyl resins such as vinyl alcohol and vinyl acetate, and copolymers of these vinyl resins with olefins. These are commercially available resins that can be readily compression molded. Also, these usually are the materials of the tube divider walls. There are no restrictions on the resins that can be used except that they must be compression moldable. The tube walls can be of a monolayer or multilayer construction. These can be formed form laminated sheets or by coextrusion. The layers can solely be plastic layers or can include paper and/or foil layers. Multilayer wall construction is preferred since various properties can be built into the wall structure.

what is claimed is:

1. A method to determine the integrity of a package barrier wall comprising:
   a package open at a first end and having at least one elongated outer wall and at least one inner divider wall to form at least two chambers;
   extending a mandrel from said open first end into each of said at least two chambers;
   placing an electrical potential difference between a first mandrel in the first chamber and a second mandrel in the second chamber; and
   measuring the potential difference and comparing said potential difference to a standard to thereby determine if there are any voids extending substantially through said at least one inner divider wall.

2. A method as in claim 1 wherein said package is a tube, said mandrels are the mandrels used to compression mold said at least one outer wall and said at least one divider wall to a nozzle portion of said tube.

3. A method as in claim 1 wherein there is relative motion between said package and said mandrels.

4. A method as in claim 1 wherein said at least one inner divider wall has a thickness of about 25 microns to about 500 microns.

5. A method as in claim 4 wherein the potential difference between said mandrels is about 200 volts to about 5000 volts.

6. A method as in claim 1 wherein the potential difference of said mandrels is about 500 volts to about 2500 volts.

7. A method as in claim 1 wherein said at least one inner divider wall is comprised of one of a polyolefin polymer or copolymer.

8. A method as in claim 7 wherein said at least one inner divider wall is comprised of a monolayer of a polyolefin.

9. A method as in claim 7 wherein said at least one inner divider wall is comprised as a multilayer structure, at least one layer being a polyolefin.

10. A method as in claim 1 wherein said at least one inner divider wall is comprised of a polyethylene terephthalate.

11. A method as in claim 1 wherein there is relative motion between said package and the mandrels.

12. A method of determining the integrity of an inner barrier wall of a tubular container during the manufacture of said tubular container comprising:
    forming a tubular body having at least one outer wall and at least one tubular body inner divider wall to divide said tubular body into a first chamber and a second chamber, said tubular body open at each end;
    inserting a first mandrel into said first chamber and a second mandrel into said second chamber; and conducting the following steps in either order
    applying a potential difference between said first mandrel and said second mandrel and measuring the potential difference over a period of time to determine if there are any passages through said at least one inner divider wall by measuring the potential differences; and
    compression molding a dispensing portion onto said tubular body, said dispensing end have an at least partially tapering outer wall to a nozzle and at least one dispensing end inner divider wall attached to said tubular body inner divider wall.

13. A method as in claim 12 wherein said inner divider wall has a thickness of about 25 microns to about 200 microns.

14. A method as in claim 12 wherein the potential difference between said mandrels is about 200 volts to about 5000 volts.

15. A method as in claim 12 wherein said inner divider wall is comprised of one of a polyolefin polymer and copolymer.

16. A method as in claim 12 wherein said inner divider wall is comprised of a polyethylene terephthalate.

17. A method as in claim 16 wherein there is relative motion between said mandrels and said tubular body.

18. A method as in claim 16 wherein the potential difference between said mandrels is about 500 volts to about 2500 volts.

19. A method as in claim 16 wherein said at least one inner divider wall is comprised of one of polyolefin polymer and copolymer.

20. An apparatus for the compression molding of a dispensing end onto a tubular body having at least one inner divider wall which divides said tubular body into at least two chambers;
    a first metallic mandrel and a second metallic mandrel, said first metallic mandrel in a first chamber and a second metallic mandrel in a second chamber;
    means to compression mold a dispensing portion on one end of said tubular body to produce at least two separate chambers up to the exit of said dispensing portion;
    means to apply a potential difference between said mandrel in said first chamber and said mandrel in said second chamber; and
    means to measure said potential difference over a period of time and determine if there are any passages between said first chamber and said second chamber.

21. An apparatus as in claim 20 wherein the potential difference is about 200 volts to about 5000 volts.

22. An apparatus as in claim 20 wherein said mandrels comprise less than about half of the linear dimension of said chambers and wherein there is relative motion between said mandrels and said tubular body while a potential difference is applied to said mandrels.

* * * * *